UNITED STATES PATENT OFFICE.

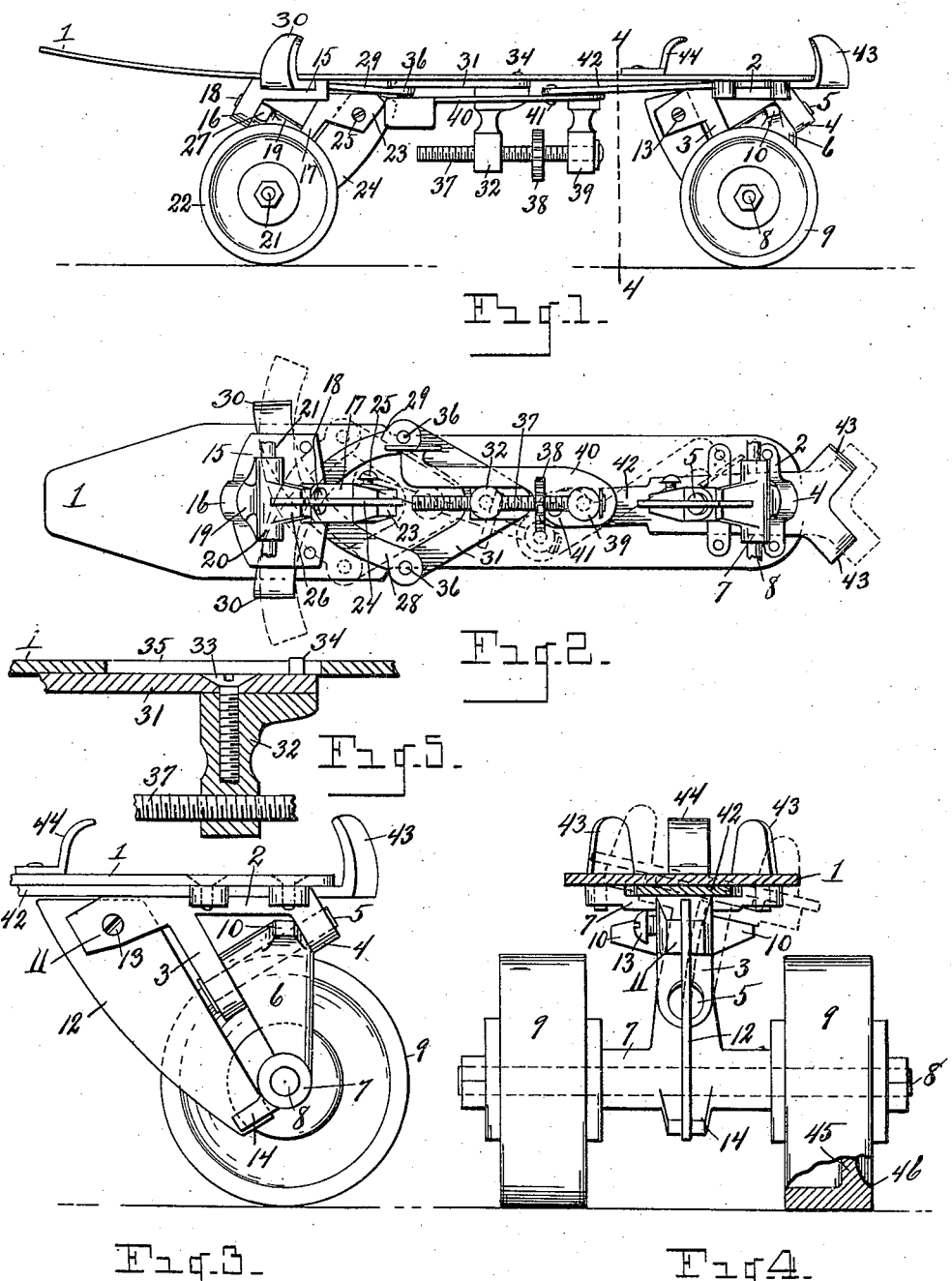

JOHN MINER, OF DETROIT, MICHIGAN.

ROLLER-SKATE.

No. 880,684.  Specification of Letters Patent.  Patented March 3, 1908.

Application filed April 15, 1907. Serial No. 368,202.

*To all whom it may concern:*

Be it known that I, JOHN MINER, a citizen of the United States, residing at Detroit, in the county of Wayne, State of Michigan, have invented certain new and useful Improvements in Roller-Skates; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in roller skates, and consists in the construction and arrangement of parts hereinafter more fully set forth and pointed out particularly in the claims.

The objects of the invention are to provide a skate of the character described of light and strong construction; to provide a heel clamping bar which passes over the rear truck plate and which lies under and moves longitudinally of the foot plate; to provide a connection between the front and rear clamping members through the medium of which they may be actuated, and which connecting means serves as a truss to support and strengthen the foot plate; to provide equalized forward clamping members which engage the sole of the shoe and which move nearly transversely of the foot plate when actuated and cross each other thereunder; to provide a pivoted yoke the ends of which connect freely with the ends of the forward clamping members to afford to said clamping members facility of movement, and to provide a wheel or roller of strong and light construction.

The above objects are attained by the association and arrangement of parts illustrated in the accompanying drawings, in which:—

Figure 1 is an elevation of a skate embodying my invention. Fig. 2 is an inverted plan, the wheels or rollers being omitted and the axles carrying said wheels or rollers being broken away. Fig. 3 is a side elevation of the rear truck and of the rear end of the foot plate. Fig. 4 is a transverse section as on line 4—4 of Fig. 1. Fig. 5 is a fragmentary view in section showing the pivotal connection between the rear end of the yoke and one of the studs carrying the adjusting screw, and the slidable connection between said yoke and the foot plate.

Referring to the characters of reference, 1 designates the foot plate which is made comparatively thin for the purpose of rendering the skate light. Secured to the under face of the foot plate at the rear is the rear truck plate 2. Projecting downwardly at an angle from the rear truck plate are the brackets 3 and 4, the forward bracket 3 being the longer and said brackets standing in parallel relation. Supported at its ends in said brackets is the inclined journal pin 5 which passes through the pivotal or hinged member 6 of the truck frame, whereby said member becomes hinged to and between the brackets 3 and 4 of that part of the truck frame which is rigidly secured to the foot plate.

Formed integral with the lower end of the hinged member 6 is a transverse sleeve 7 through which passes the rear axle 8 on the ends of which the rear wheels 9 are journaled. This arrangement allows the foot plate to rock upon the inclined journal pin 5 and causes the rear axle to assume an oblique position with respect to the transverse axis of said plate.

To limit the rocking movement of said plate upon said inclined journal pin, the hinged member 6 is provided with the laterally extending lugs 10 which are adapted to engage the under face of the truck plate 2 as the foot plate rocks from side to side.

Projecting from the bracket member 3 of the rear truck is a slotted arm 11 which receives the upper end of the flat steel spring 12, said spring being secured therein by the set screw 13, or other suitable means. The lower end of said spring is freely held between the sides of a slotted lug 14 which projects from the sleeve 7 through which passes the axle of the rear truck. The spring 12 permits the foot plate to rock from side to side upon the application of a sidewise pressure thereto, but is sufficiently strong to return said parts to their normal position upon the removal of the pressure, as will be well understood.

The forward truck frame has an upper part or truck plate 15 suitably secured to the foot plate 1 and which carries the downwardly extending inclined bracket members 16 and 17 which stand approximately parallel and of which the bracket 17 is the longer. Mounted at its ends in said brackets is the inclined journal pin 18 which passes through the pivotal or hinged member 19 of the lower part of the truck frame, serving to effect a hinge connection between the lower part of the truck frame and the upper part of said frame which is rigidly secured to the foot plate upon said inclined pin, the axis of which stands at an obtuse angle with respect to that of the pin 5 of the rear truck frame. Formed integral with the member 19 at the lower end thereof is a transverse sleeve 20 through which passes the forward axle 21, on the projecting ends of which the forward wheels 22 are suitably journaled.

Projecting from the bracket 17 of the forward foot plate is a slotted arm 23 in the slot of which is confined the upper end of a flat spring 24 by means of a set screw 25. The lower end of said spring is confined between the sides of the slotted lug 26 formed integral with the sleeve 20, the tension of said spring being sufficient to return the parts to their normal position upon a removal of any pressure which may have been applied to the foot plate to cause it to rock upon the journal pin 18. It will now be apparent that, because of the incline of the journal pins 5 and 18, the rocking of the foot plate from side to side will cause the axles of the wheels to swing on a vertical axis and the skate to describe a circle in either direction according to the rocking of said plate, as will be well understood in the art. To limit the rocking movement of the forward truck member secured to the foot plate upon the inclined journal pin 18, the hinged member 19 is provided with the transverse lugs 27 which are engaged by the under face of the truck plate 15 as said plate is rocked in a manner as described with respect to the rear truck frame.

The forward clamping members employed to engage the sole of the shoe to secure the skate to the foot of the wearer, consists of the curved, longitudinally reciprocatory arms 28 and 29 respectively carrying at their outer ends the jaw members 30 curved to embrace the sole of the shoe. Said arms slide over the truck plate 15 and cross each other thereover, the inner end of each of said arms extending to the opposite side of the foot plate from that at which its jaw member projects, thereby affording more nearly a transverse movement of the clamping arms when actuated with respect to the foot plate.

Mounted to slide upon the under face of the foot plate is a yoke 31 having diverging ends. Said yoke is pivotally connected with a depending stud 32 by means of the screw 33 which passes through said yoke into said stud and whose head is countersunk in said yoke. To direct the yoke in its sliding movement, it is provided with a pin 34, see Fig. 5, which extends into a longitudinal slot 35 formed in the foot plate. The inner ends of the clamping arms 28 and 29 are pivotally connected at 36 with the forward ends of the yoke 31, whereby as said yoke is reciprocated longitudinally of the foot plate, said clamping arms are caused to slide transversely thereof to extend or retract the jaw members carried on their outer ends.

Threaded in the depending end of the stud 32 is an adjusting screw 37 having a knurled wheel 38 thereon for the purpose of rotating it. The rear end of said screw is swiveled in the depending end of a post or stud 39 which is in turn pivotally mounted on the end of the clamp actuating and locking lever 40 which is fulcrumed at 41 to the forward end of the rear clamping bar 42. The clamping bar 42 is adapted to slide longitudinally on the under face of the foot plate and passes over the rear truck plate 2, as clearly shown in Fig. 3, being confined by said plate and guided thereby in its movement. Upon the extreme rear end of the clamping bar 42 which projects beyond the heel of the foot plate, are the diverging jaw members 43 which are adapted in conjunction with the jaw member 44 mounted on the foot plate to clamp the heel of the shoe, as will be well understood.

By swinging the lever 40 upon its point of fulcrum 41 the stud 39 mounted thereon will be caused to describe the arc of a circle and carry the screw 37 forwardly or backwardly as the case may be, thereby sliding the yoke 31, the pivotal mounting of the studs 32 and 39 in which the adjusting screw 37 is supported, permitting said studs to turn upon said pivots to permit of said movement. As the yoke is reciprocated, the arms 28 and 29 are caused to slide transversely of the foot plate to extend or retract their clamping ends as the case may be.

It will be noted that when the yoke 31 shall have reached the limit of its movement in either direction, the pivotal point or fulcrum of the lever 40 shifts from the fulcrum 41 to the pivotal point of connection between said lever and the rear stud 39, thereby causing the clamping bar 42 to slide longitudinally to actuate the rear clamping jaws 43.

It will be noted that the forward clamping arms 28 and 29 are free to be shifted transversely of the foot plate so that in adjusting the skate to the sole of the shoe, it may be placed directly in the center of the sole, or nearer one edge than the other, according to the desire of the wearer, said parts being securely held against movement when tension is applied thereto in the operation of clamping the skate to the shoe. When the lever 40 is swung rearwardly, as shown by dotted lines in Fig. 2, the jaw members at the front and rear are extended and when said lever is thrown forwardly, as shown by solid lines in said last-mentioned figure, said jaw members are retracted to engage the sole and heel of the shoe of the wearer. It will further be noted that by crossing the curved arms 28 and 29 which carry the forward jaws 30 and actuating them from opposite sides of the foot plate, a more direct transverse draw upon said arms is accomplished, thereby increasing the clamping power of the jaws carried thereby. It will further be noted that because of the direct longitudinal movement of the bar 42 carrying the rear jaws 43 the maximum power may be exerted upon said rear jaws to clamp the heel between them and the fixed jaw 44.

It will further be noted that when the parts are in the position shown by solid lines in Fig. 2, the fulcrum point 41 of the lever 40 stands at one side of the longitudinal axis of the connecting screw 37 which represents the line of draft between the movable clamping members of the skate, whereby the clamping parts become locked in the clamping position, thereby preventing the accidental release or disengagement of said parts.

It will be further noted that the connecting means between the forward clamping arms and the rear longitudinally movable bar 42, which consist of the yoke 31, the studs 32 and 39 and the connecting screw 37, serve, when tension is placed upon said parts, as a kind of truss to strengthen the foot plate at the middle and prevent the depression thereof, enabling a comparatively light plate to be used without danger of rendering said plate too weak to carry the strain which is placed thereon when the skate is in use.

In the use of skates of this character, the rollers or wheels 9 are subjected to the greatest wear and strain upon the outer edges thereof. To provide wheels of a character to withstand such strain in use, I have placed the web 45 at one side of the center of the wheels, as shown in Fig. 4, and have made a short thick flange 46 on the outside of said web to strengthen and protect the outer edge of the rim. In this manner I am able to produce a very strong wheel which is comparatively light.

Having thus fully set forth my invention, what I claim as new and desire to secure by Letters Patent, is:—

1. In a skate, the combination with the foot plate, of the forward movable clamping arms slidable upon the under face of said plate and crossing from side to side, jaw members upon the outer ends of said arms, a yoke having forwardly extending diverging end portions which are pivotally connected to the inner ends of said arms respectively, said yoke being pivotally mounted at the juncture of said diverging end portions and slidable longitudinally of the foot plate, and means for actuating said yoke.

2. In a skate the combination with the foot plate, of the forward truck plate secured to the under face thereof, and clamping arms slidable between the foot plate and said truck plate transversely of the foot plate and crossing each other to the opposite sides of said plate, a rear truck plate, a single clamping bar slidable longitudinally of the foot plate between the rear truck plate and said foot plate, said clamping bar having jaw members at its rear end, a yoke slidable upon the foot plate having forwardly extending diverging end portions which are pivoted to the inner ends of the forward clamping arms respectively, said yoke being pivotally mounted at the juncture of said diverging end portions, means for adjustably connecting said yoke with the forward end of the rear clamping bar, and a lever pivotally connected to said bar and to said connecting means for actuating said parts.

3. In a skate, the combination of the foot plate, the forward clamping arms slidably mounted upon the under face of said plate, said arms having jaw members at their outer ends and crossing said plate transversely, a yoke movable longitudinally of the foot plate having diverging forwardly extending end portions which are pivoted to the inner ends of said clamping arms respectively, said yoke being pivoted to swing transversely of the foot plate to allow of a transverse movement of said arms in the same direction, and a pivoted lever for sliding said yoke.

4. In a skate, the combination of the foot plate, the forward clamping arms slidably mounted on the under face of said plate and crossing said plate transversely, a slidable yoke having forwardly extending diverging arms which are pivoted to the inner ends of said clamping arms respectively, said yoke being pivotally mounted to permit its diverging arms to swing transversely of the foot plate, a rear clamping bar mounted to slide upon the under face of the foot plate and having a jaw member at its rear end, a lever pivoted to the forward end of said rear clamping bar, a stud pivoted to said lever, a stud pivoted to said yoke, and a screw threaded in one of said studs and swiveled in the other.

In testimony whereof, I sign this specification in the presence of two witnesses.

JOHN MINER.

Witnesses:
O. B. BAENZIGER,
I. T. HOWLETT.